3,381,682
ADJUSTABLE ELECTRODE ASSEMBLY FOR
A PLETHYSMOGRAPH
Štěpán Figar, Prague, Czechoslovakia, assignor to Ceskoslovenska akademie ved, Prague, Czechoslovakia
Filed July 14, 1965, Ser. No. 471,890
Claims priority, application Czechoslovakia,
July 27, 1964, 4,319/64
12 Claims. (Cl. 128—2.05)

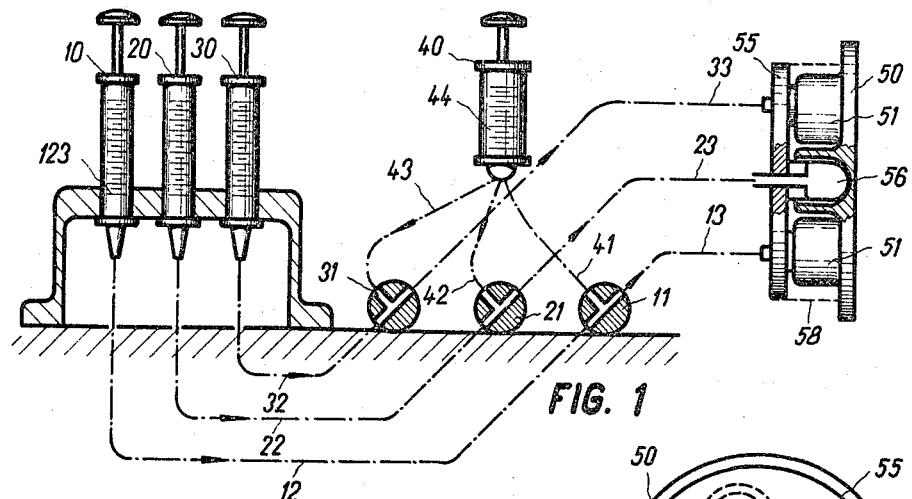
FIG. 1
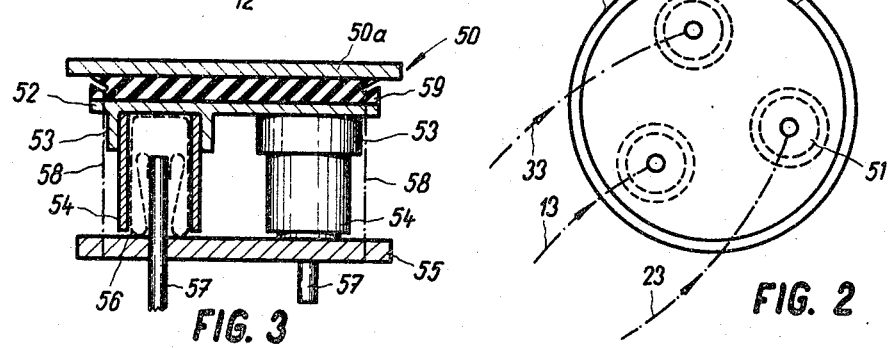
FIG. 3
FIG. 2
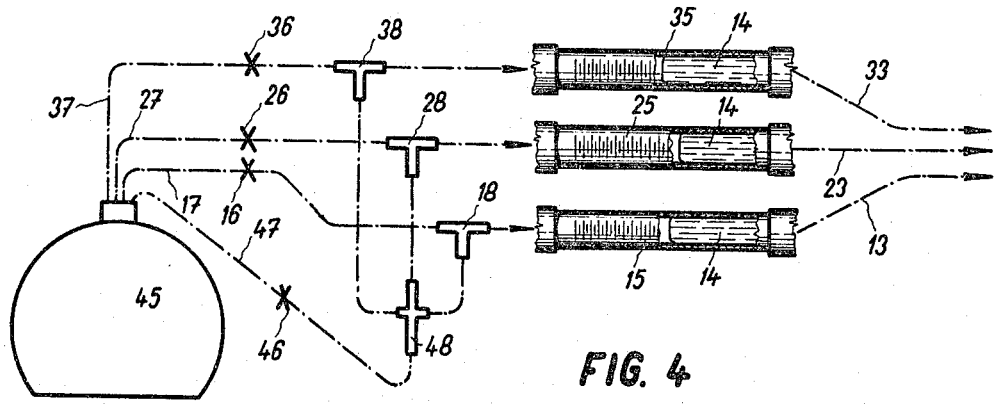
FIG. 4
INVENTOR.
Štěpán Figar

United States Patent Office 3,381,682
Patented May 7, 1968

This invention relates to the investigation of blood circulation and of other factors which affect the volume of portions of the human body, and particulorly to plethysmography.

In its more specific aspects, the invention is concerned with an adjustable electrode assembly for a plethysmograph in which changes in the distance between a sensing electrode and a portion of the body cause variations in the capacitance of a circuit and which is equipped with indicating or recording means for displaying the capacitance changes as a function of the varying distance.

The sensitivity of a plethysmograph of the capacitance type depends critically on the adjustment of the minimum air gap between the sensing electrode and the body surface. Sensitivity decreases approximately with the square of the air gap width.

When the electrode is adjustably mounted on a stationary support, sensitivity thus can be improved by moving the electrode toward the test subject. The effect of such movement can be gaged from the indications of the indicating or other display unit of the plethysmograph, but these indications are themselves influenced by the presence of an adjusting hand and the like near the electrode.

An object of the invention, therefore, is the provision of a remote control arrangement for shifting a sensing electrode of a plethysmograph relative to its stationary support.

Another object is the provision of an arrangement which permits the electrode not only to be shifted in a direction toward and away from its support, but also to be tilted relative to that direction.

Yet another object is the provision of a remote control arrangement which provides a remote indication of the spacing of the electrode from its support and of the angular position of the electrode relative to its general direction of movement, thus making it unnecessary for the operator to approach the electrode itself, and thereby to upset the capacitance of the measuring circuit when it is desired to adjust the electrode spacing or to inspect the electrode for proper spacing.

Remote operation and inspection of the plethysmograph electrodes is advantageous from a psychological point of view since it minimizes manipulations which may cause a nervous reaction of the person tested, and thereby distort the test results.

With these and other objects in view, the invention provides at least one hydraulic jack which is interposed between the support and the electrode. A pressure vessel which may be as far from the jack as desired or necessary communicates with the jack by means of rigid or flexible pipes of fixed capacity. A continuous liquid column practically fills the jack and partly fills the pressure vessel so that the column has an end face in the pressure vessel. Actuating means are provided for shifting that end face, and its position is indicated by suitable means, thus providing a remote reading of the remotely controlled electrode position.

The exact nature of this invention as well as other objects and advantages thereof will be readily apparent from consideration of the following specification relating to the annexed drawing in which:

FIG. 1 shows an adjustable electrode assembly of the invention and its hydraulic system partly in elevational section, and partly by conventional symbols;

FIG. 2 is a front-elevational view of the electrode assembly of FIG. 1;

FIG. 3 shows the device of FIG. 2 in elevational section on a larger scale; and

FIG. 4 illustrates the hydraulic system of a modified embodiment of the invention in a fragmentary view corresponding to that of FIG. 1.

Referring now to the drawing in detail, and initially to FIG. 1, there is shown a main pressure vessel 40 which is a conventional glass syringe of relatively large capacity whose barrel carries engraved calibrations 44. Rigid pipes 41, 42, 43, which may also be made of glass, connect the syringe to respective three-way valves 11, 21, 31. Pressure lines 12, 22, 32 of similar material respectively connect the valves to three identical smaller syringes 10, 20, 30 of the same type as the syringe 40 which are mounted in a row on a common fixed bracket 123. The valves 11, 21, 31 are also connected by relatively long hydraulic lines 13, 23, 33 to three identical miniature hydraulic jacks 51 which are interposed between a plate-shaped sensing electrode 50 and a rigid support plate 55. It will be understood that the plate 55 is normally held in a fixed spatial relationship to the body portion investigated in a manner evident, for example, from my simultaneously filed application Ser. No. 471,891.

The electrode 50 and the support plate 55 are circular in shape and coaxial, as is best seen in FIGS. 2 and 3, and are axially urged toward each other by rubber cords 58. The jacks 51 are arranged near the circumference of the electrode and the plate, and are angularly offset 120° from each other. They expand and contract in an axial direction.

Details of the electrode assembly are shown in FIG. 3. The electrode 50 is laminated. It has a metallic face plate 50a which is separated from a metallic backing plate 52 by a rubber layer 59 which electrically insulates the face plate 50a from the remainder of the illustrated structure. The lead which connects the face plate 50a to the capacitance bridge (not shown) in the measuring circuit of the plethysmograph has been omitted since it is not directly relevant to this invention.

Each jack 51 includes a ring 53 which is integral with the backing plate 52. A cylindrical guide sleeve 54 is coaxially arranged in the ring 53. A pipe 57 is fixedly fastened to the support plate 55 and carries a sealed rubber bag 56 whose lateral expansion is limited by the sleeve 54. The three pipes 57 are respectively connected to the three hydraulic lines 13, 23, 33.

The aforedescribed apparatus is operated as follows:

A supply of suitable liquid (water, hydraulic brake fluid, lubricating oil) is distributed in the three rubber bags 56, the valves 11, 21, 31, the syringes 10, 20, 30, 40 and the connecting conduits, and the air originally present is expelled as completely as possible. With the valves 11, 21, 31 in a position in which they connect the jacks to the large syringe 40 and shut off the small syringes 10, 20, 30 (90° clockwise from the position illustrated in FIG. 1), the electrode 50 is precisely adjusted so that it is perpendicular to the axes of the jacks 51. The valves are then turned 90° farther so that they connect the small syringes 11, 21, 31 individually with the jacks 51, and shut off the large syringe 40.

The electrode may now be shifted linearly by moving the pistons of the several identical syringes equal distances which can be read from the spaced calibration indicia on the syringe barrels. If it is desired to tilt the electrode 51 from its normal perpendicular orientation relative to its principal direction of movement, the pistons of the syringes 10, 20, 30 are moved different distances.

Leakage losses are conveniently compensated for by setting the valves in the manner illustrated, restoring the three small syringes to positions of identical readings on their respective calibrations, and adjusting the electrode 50 to its normal perpendicular position.

When a desired electrode setting is achieved, the valves 11, 21, 31 are turned to a position 90° counterclockwise from that shown in FIG. 1, and the three jacks 51 in cooperation with the rubber cords 58 maintain the position of the electrode. The cords 58 prevent subatmospheric pressures from being established in the hydraulic system when the electrode 50 is drawn toward the plate 55 by outward movement of the pistons in the syringes 10, 20, 30.

The modified apparatus shown in FIG. 4 employs compressed air or any other fluid immiscible with the liquid employed in the hydraulic system for actuating movements of the several columns of liquid which energize the jacks 51.

A receptacle 45 for compressed air, which may be a rubber balloon, is connected by pressure hose lines 17, 27, 37 to one end of each of three calibrated pipettes 15, 25, 35. Needle valves 16, 26, 36 and T-fittings 18, 28, 38 are arranged in the three hose lines. A fourth hose line 47 equipped with a needle valve 46 connects the receptacle 45 to a cross fitting 48 whose three outlet arms are connected to the aforementioned three T-fittings.

The other ends of the three pipettes 15, 25, 35 are respectively connected to the three jacks 51 of an electrode assembly not shown in FIG. 4 and identical with the structure illustrated in FIGS. 2 and 3. Liquid 14 fills the jacks, the hydraulic lines 13, 23, 33, and fills the axially terminal portion of each pipette directly communicating with the associated jack. Air fills the other axially terminal portion of each pipette. The pipettes are permeable to light and carry an axial row of indicia, the index mark aligned with the interface of air and liquid in the pipette intermediate the two axially spaced portions of the same indicating the position of the electrode, not seen in FIG. 4.

The jacks are uniformly provided with hydraulic fluid by opening the needle valve 46, or they are individually provided with hydraulic fluid by opening the several valves 16, 26, 36. The electrode 50 is withdrawn toward the support plate 55 by the cords 58 when the receptacle 45 is vented to the atmosphere.

Obviously many modifications and variations of the present invention are possible in the light of the above teachings. It is therefore to be understood that, within the scope of the appended claims, the invention may be practiced otherwise than as specifically described.

What is claimed is:

1. An electrode assembly for a plethysmograph and the like comprising, in combination:
    (a) a support member;
    (b) an electrode member;
    (c) hydraulic jack means interposed between said support member and said electrode member for moving said members in a predetermined direction relative to each other;
    (d) a pressure vessel communicating with said jack means;
    (e) a continuous liquid column substantially filling said jack means and a portion of said pressure vessel, said column having an end face in said pressure vessel;
    (f) actuating means for shifting said end face in said vessel; and
    (g) indicating means for indicating the position of said end face.

2. An assembly as set forth in claim 1, wherein said hydraulic jack means include a resiliently expandable container connected to said pressure vessel and substantially filled with the liquid of said column, said container being interposed between said support and said electrode; guide means limiting expansion of said container transversely of said direction and guiding the container to expand in said direction; and yieldably resilient means biasing said members to move toward each other in said direction.

3. An assembly as set forth in claim 1, further comprising yieldably resilient means biasing said members to move toward each other in said direction.

4. An assembly as set forth in claim 1, wherein said pressure vessel is the cylinder of a syringe, said actuating means include a piston axially movable in said syringe, said syringe being permeable to light, and said indicating means including a plurality of axially spaced indicia on said cylinder.

5. An assembly as set forth in claim 1, wherein said pressure vessel has two spaced portions, said hydraulic jack means communicating with one of said portions, and said liquid column filling said one portion; said actuating means including a source of a fluid immiscible with said liquid and communicating with the other portion of said pressure vessel, a portion of said pressure vessel intermediate said two portions being permeable to light, and said indicating means including a plurality of indicia on said intermediate portion.

6. An assembly as set forth in claim 5, wherein said source is an expandable resilient receptacle filled with said fluid under pressure and connected to said pressure vessel.

7. An assembly as set forth in claim 1, further comprising valve means interposed between said pressure vessel and said jack means for controlling the flow of said liquid.

8. An assembly as set forth in claim 1, further comprising electrical insulating means interposed between said electrode member and said support member for electrically insulating said members from each other.

9. An assembly as set forth in claim 8, wherein said insulating means is interposed between said electrode member and said jack means.

10. An electrode assembly for a plethysmograph and the like comprising, in combination:
    (a) a support member;
    (b) an electrode member having a plurality of portions aligned with respective portions of the support member in a predetermined direction to form therewith a plurality of pairs of aligned portions;
    (c) a plurality of hydraulic jack means respectively interposed between the members of said pairs for moving the same relative to each other in said predetermined direction;
    (d) a plurality of first pressure vessels;
    (e) a plurality of valve means interposed between said first pressure vessels and said hydraulic jack means respectively;
    (f) a second pressure vessel communicating with each of said valve means;
    (g) a liquid column substantially filling said jack means, a portion of each of said first and second pressure vessels, and said valve means, said column having an end face in each pressure vessel
        (1) said valve means being movable between a first position in which the associated first pressure vessel is connected to the associated hydraulic jack means and the second pressure vessel is separated from said first pressure vessel and said associated jack means, and a second position in which said second pressure vessel is connected to said associated jack means;
    (h) actuating means for shifting said end face in each of said pressure vessels.

11. An assembly as set forth in claim 10, further comprising indicating means for indicating the position of said end faces in said pressure vessels.

12. An electrode assembly for a plethysmograph and the like comprising, in combination:
    (a) a support member;
    (b) an electrode member;

(c) hydraulic jack means interposed between said support member and said electrode member for moving said members in a predetermined direction relative to each other;
(d) a plurality of first pressure vessels, each first pressure vessel having two spaced portions,
  (2) an associated hydraulic jack means communicating with one of said two portions;
(e) a second pressure vessel;
(f) a plurality of valve means, each valve means being interposed between said second pressure vessel and the other one of the two portions of a respective first pressure vessel,
  (1) respective portions of said first pressure vessels intermediate said two portions being permeable to light; and
(g) a plurality of indicia on each of said intermediate portions, said indicia being spaced in a direction from said one to said other portion.

References Cited

UNITED STATES PATENTS

| | | | |
|---|---|---|---|
| 2,452,799 | 11/1948 | Speaker et al. | 128—2.1 |
| 3,010,698 | 11/1961 | Allen et al. | 254—93 X |
| 3,189,024 | 6/1965 | Smith | 128—2.05 |

FOREIGN PATENTS

| | | |
|---|---|---|
| 627,341 | 6/1927 | France. |

RICHARD A. GAUDET, *Primary Examiner.*

W. E. KAMM, *Examiner.*